US012001062B2

United States Patent
Conrad et al.

(10) Patent No.: US 12,001,062 B2
(45) Date of Patent: Jun. 4, 2024

(54) FIBER OPTIC GUIDE PIN CHANGER AND FIELD TOOL WITH ADAPTER

(71) Applicant: US Conec Ltd., Hickory, NC (US)

(72) Inventors: Craig M. Conrad, Hickory, NC (US); Jason Higley, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 18/324,651

(22) Filed: May 26, 2023

(65) Prior Publication Data

US 2023/0296851 A1    Sep. 21, 2023

Related U.S. Application Data

(60) Continuation of application No. 17/829,680, filed on Jun. 1, 2022, now Pat. No. 11,693,192, which is a division of application No. 17/013,751, filed on Sep. 7, 2020, now Pat. No. 11,360,275, which is a continuation of application No. 16/236,685, filed on Dec. 31, 2018, now Pat. No. 10,768,377, which is a division of application No. 15/801,490, filed on Nov. 2, 2017, now Pat. No. 10,168,487.

(60) Provisional application No. 62/416,676, filed on Nov. 2, 2016.

(51) Int. Cl.
    *G02B 6/38*    (2006.01)
(52) U.S. Cl.
    CPC .......... *G02B 6/3841* (2013.01); *G02B 6/3898* (2013.01)
(58) Field of Classification Search
    CPC ................................ G02B 6/38; G02B 6/3898
    See application file for complete search history.

(56) References Cited

U.S. PATENT DOCUMENTS

| | | | |
|---|---|---|---|
| 6,149,313 A | 11/2000 | Giebel et al. | |
| 6,554,487 B2 | 4/2003 | Nolan | |
| 6,669,377 B2 | 12/2003 | Barnes et al. | |
| 6,702,477 B1 | 3/2004 | Ngo | |
| 9,709,755 B2 | 7/2017 | Larkin et al. | |
| 10,168,487 B2 * | 1/2019 | Conrad | G02B 6/3898 |
| 10,768,377 B2 * | 9/2020 | Conrad | G02B 6/3898 |
| 11,360,275 B2 * | 6/2022 | Conrad | G02B 6/3898 |
| 11,693,192 B2 * | 7/2023 | Conrad | G02B 6/3841 |
| | | | 385/52 |
| 2017/0176694 A1 | 6/2017 | Childers et al. | |
| 2017/0205589 A9 | 10/2017 | Nguyen et al. | |
| 2017/0315308 A1 | 11/2017 | Kamada et al. | |

(Continued)

OTHER PUBLICATIONS

Kamada et al., "Ultra-Compact MPO Connector with Excellent Handling and Bending Strength", SEI Technical Review, No. 82, Apr. 2016, pp. 117-120.

*Primary Examiner* — Tina M Wong
(74) *Attorney, Agent, or Firm* — Michael L Leetzow PLLC; Shubhrangshu Sengupta

(57) ABSTRACT

A pin exchanger has protrusions from gripping elements that engage fiber optic guide pins. Guide beams on the pin exchanger provide a reference for aligning the guide pins and the pin exchanger with a fiber optic connector and a fiber optic ferrule. An adapter is also provided that has openings to receive the guide beams. The adapter is preferably installed in a field tool and together they engage the fiber optic connector, align the pin exchanger and move the guide pin holder to allow guide pins to be inserted or removed.

20 Claims, 13 Drawing Sheets

(56) References Cited

U.S. PATENT DOCUMENTS

2020/0003963 A1 1/2020 Iizumi et al.
2022/0291458 A1 9/2022 Conrad et al.

* cited by examiner

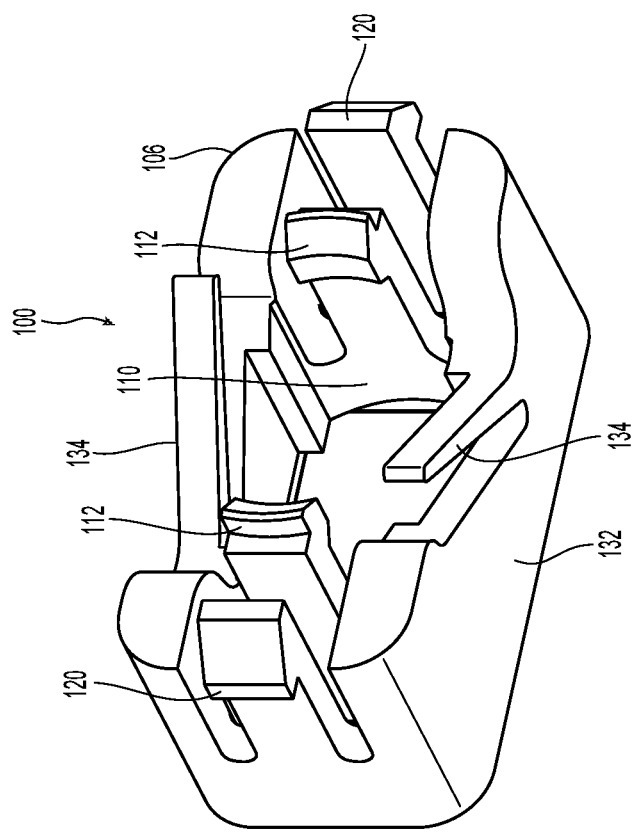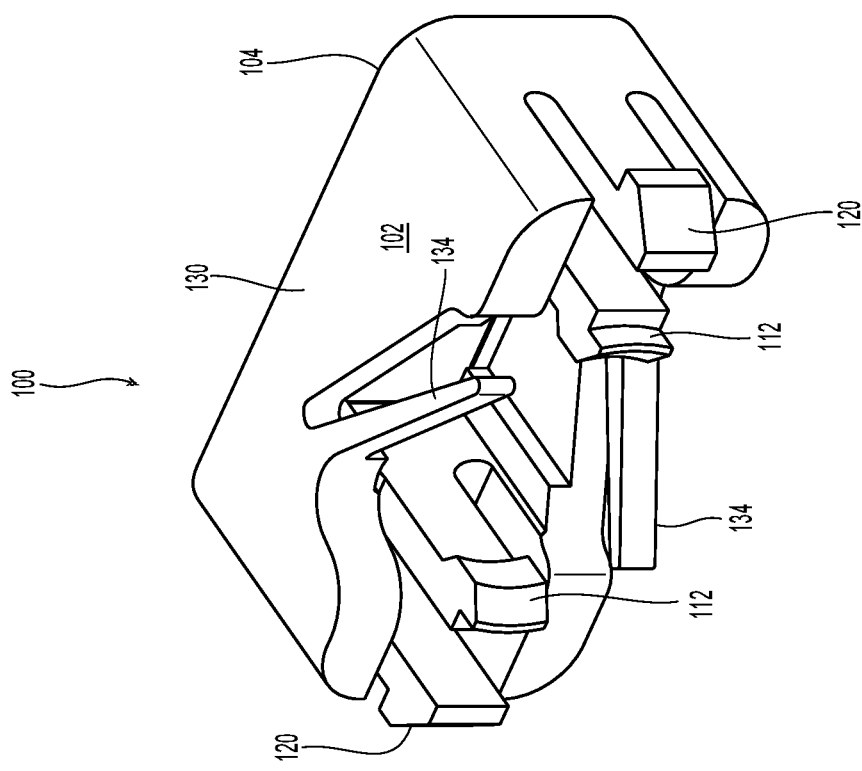
Fig. 11

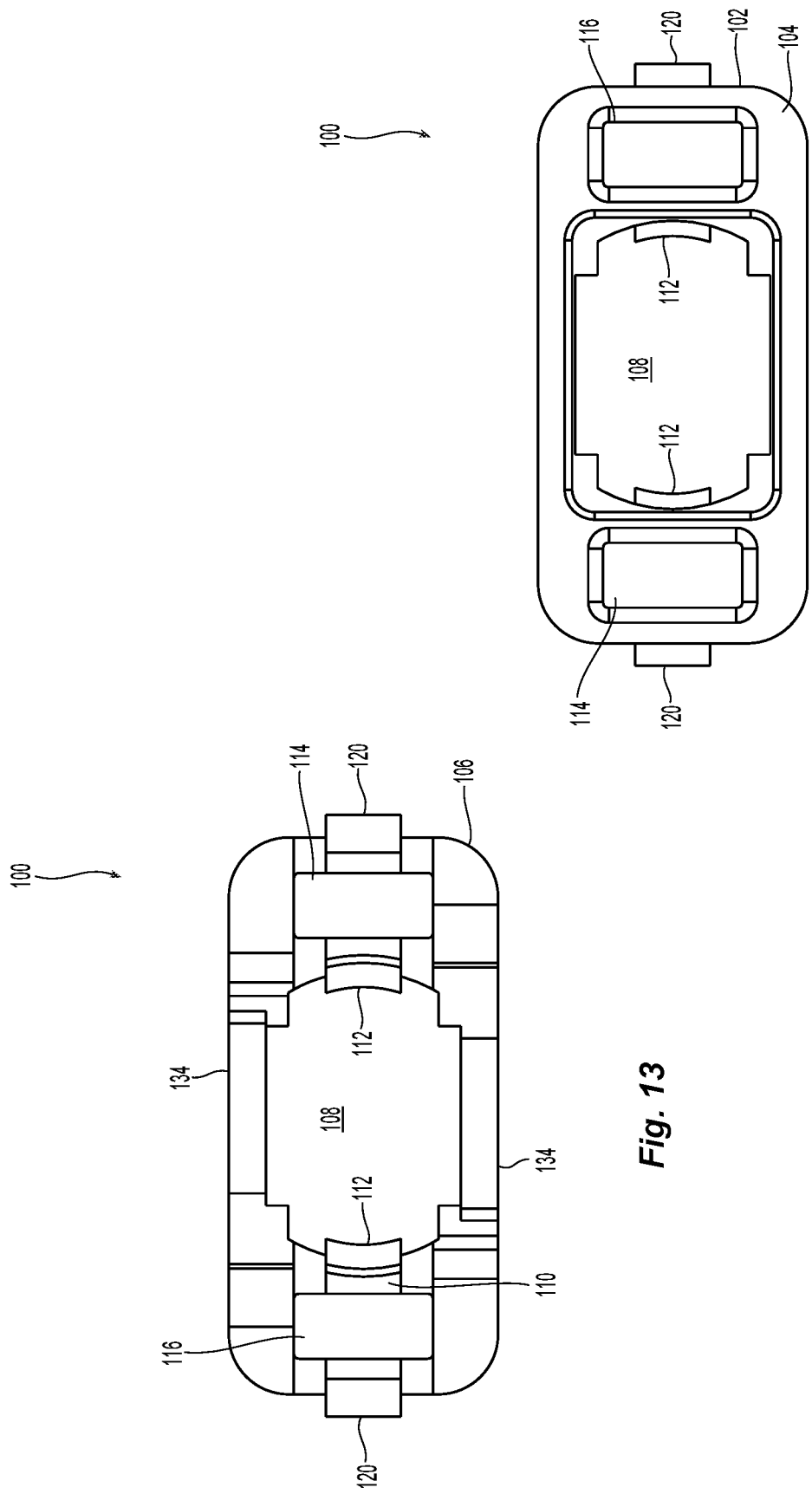

FIBER OPTIC GUIDE PIN CHANGER AND FIELD TOOL WITH ADAPTER

REFERENCE TO RELATED CASE

This application claims priority under 35 U.S.C. § 119 (e) to provisional application No. 62/416,676 filed on Nov. 2, 2016, and under 35 U.S.C. § 120 to U.S. patent application Ser. No. 15/801,490, filed on Nov. 2, 2017, and to U.S. patent application Ser. No. 16/236,685, filed on Dec. 31, 2018, and to U.S. patent application Ser. No. 17/013,751, filed on Sep. 7, 2020, and to U.S. patent application Ser. No. 17/829,680 filed on Jun. 1, 2022, the contents of which are hereby incorporated by reference in their entirety.

BACKGROUND OF THE INVENTION

Field of the Invention

There are some fiber optic connectors that are designed to use fiber optic guide pins to align with other fiber optic connectors. One type of fiber optic connector is the MTP® brand fiber optic connector that is sold by the Applicant of this application. Other similar fiber optic connectors offered by other companies also require that fiber optic guide pins are used to align the fiber optic connectors, and the fiber optic ferrules in particular, when two connectors are mated. However, there are times in the field when a technician is installing fiber optic connectors and is faced with the prospect of two female connectors (without guide pins) or two male connectors (with the guide pins). There are a number of fiber optic connectors that allow for guide pins to be added to or removed from the fiber optic connector. One such connector has a unique guide pin clamp that allows for the addition or removal of guide pins and has been filed as Ser. No. 15/383,356 to the same applicant. However, the handling of the guide pins in the field is difficult at best and impossible at worst given the size of the guide pins, the size of the guide pin openings in the fiber optic ferrule, and the conditions under which the pins are to be removed or added. Additionally, it is usually better to insert both guide pins at the same time, making it even more difficult unless there is a tool to allow for the simultaneous insertion/removal of both guide pins and aligning the guide pins with the guide pin openings.

Thus, a fiber optic guide pin changer that has the ability to hold guide pins for use whenever needed (storage) and also is configured to either insert or remove the guide pins is needed.

SUMMARY OF THE INVENTION

The present invention is directed to a pin exchanger for an fiber optic connector that included a first gripping element, a second gripping element disposed substantially parallel to and spaced apart from the first gripping element thereby defining a space therebetween, a guide beam attached to each side of the first and second gripping elements, each of the guide beams having a first leg extending from the first gripping element and a second leg extending from the second gripping element, the first and second legs being connected to one another at an end thereof opposite the gripping elements, a first protrusion extending from the first gripping element and extending toward the second gripping element in the space, and a second protrusion extending from the second gripping element and extending toward and aligned with the first protrusion in the space, the first and second protrusion forming a junction disposed between the first and second gripping elements to engage a portion of at least one guide pin.

In some embodiments, the at least one guide pin extends beyond the junction a first predetermined distance and each of the pair of guide beams extend a second predetermined distance away from the first and second gripping elements, the second predetermined distance being greater the first predetermined distance.

In some embodiments, flexure elements are provided between the gripping elements and include a stop surface disposed adjacent to and rearwardly from the first and second protrusions thereby preventing the at least one guide pin from moving rearwardly in the pin exchanger.

In some other embodiments, the each of the guide beams align with a guide beam opening in an adapter, the adapter being disposed in a field tool and having a fiber optic connector opening between the two guide beam openings.

In another embodiment, an adapter is included that includes a main body having a front end and a back end opposite to the front end, a first opening extending between the front end and the back end to receive the fiber optic connector through the back end, a pair of projections extending into the opening to engage the fiber optic connector, and a first guide beam opening and a second guide beam opening to receive guide beams from the pin exchanger from the front end, the first and second guide beam openings being on opposite sides of the first opening, the first and second guide beam openings disposed relative to the first opening such that the pin exchanger, when inserted into the guide beams openings, is positioned relative to a fiber optic connector so as to remove or insert guide pins therein.

According to another aspect of the present invention, there is a method of removing at least one guide pin from a fiber optic connector, the fiber optic connector having a connector housing and being inserted into an adapter, the method including the steps of aligning a pin exchanging tool with the adapter and the connector housing, the pin exchanging tool having a first gripping element and a second gripping element disposed substantially parallel to and spaced apart from each other, pushing the pin exchanging tool into the adapter and towards a front end of the fiber optic connector so that the pin exchanging tool engages engages the at least one guide pin in a ferrule of the fiber optic connector between the first and second gripping elements, and pulling the pin exchanging tool away from the front end of the fiber optic connector and out of the adapter while exerting force on the first and second gripping elements to remove the at least one guide pin.

According to another aspect of the present invention, there is a method of inserting at least one guide pin into a fiber optic connector, the method including the steps of aligning a pin exchanging tool with the connector housing and the adapter, the pin exchanging tool having a first gripping element and a second gripping element disposed substantially parallel to and spaced apart from each other, at least one guide pin disposed between the first and second gripping elements, pushing the pin exchanging tool into the adapter and towards a front end of the fiber optic connector so that the pin exchanging tool inserts the at least one guide pin into a ferrule of the fiber optic connector while exerting force on the first and second gripping elements, and pulling the pin exchanging tool away from the front end of the fiber optic connector and the adapter after releasing force on the first and second gripping elements.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

BRIEF DESCRIPTION OF THE DRAWINGS

FIG. 11 is a top and bottom perspective view of the adapter of FIG. 6 from the rear side;

FIG. 13 is a elevational view of the adapter of FIG. 6 from the rear; and

FIG. 14 is an elevational view of the adapter of FIG. 6 from the front.

DETAILED DESCRIPTION OF THE PREFERRED EMBODIMENTS

Figure 1:
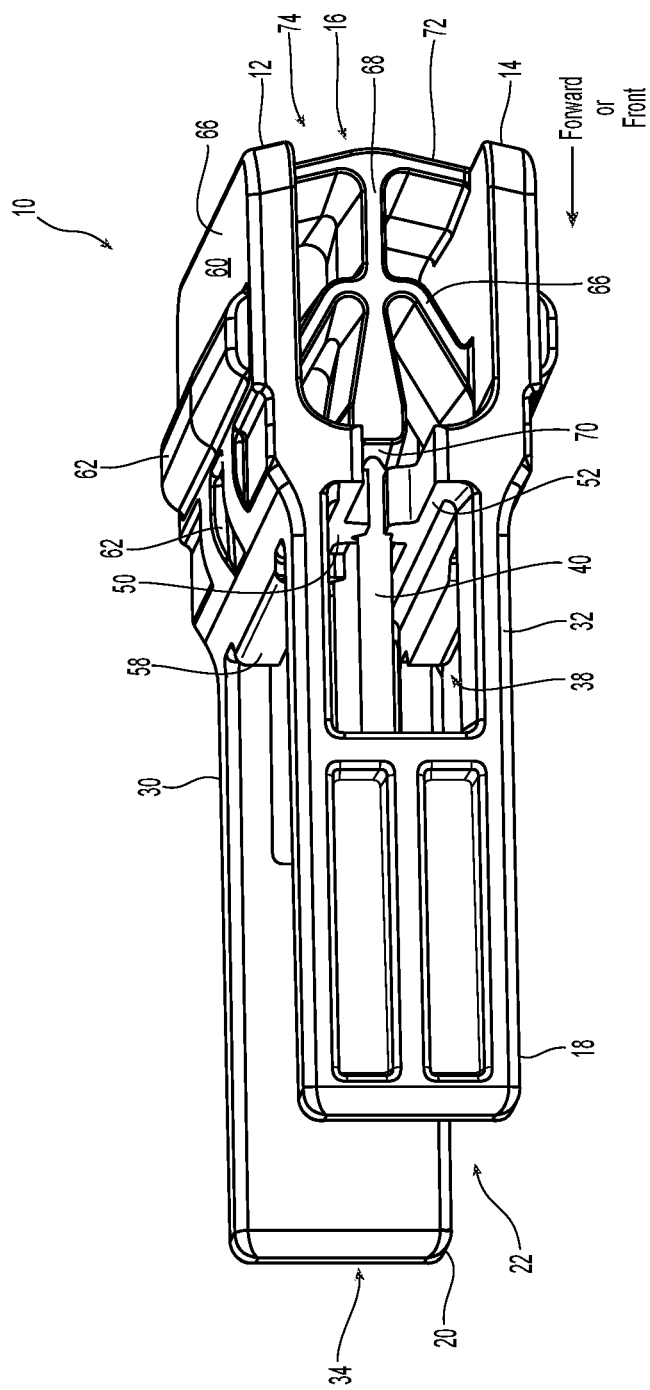
FIG. 1 is a left side perspective view of one embodiment of a pin exchanger according to the present invention.
Figure 2:
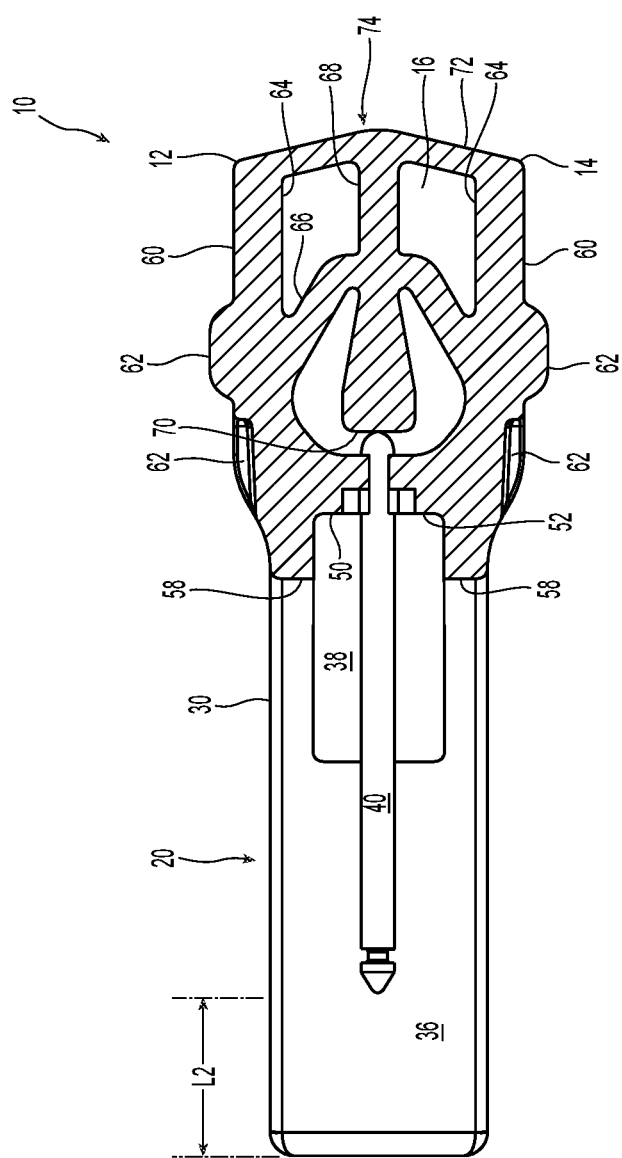
FIG. 2 is a cross section view from the left side of the pin exchanger of FIG. 1.
Figure 3:
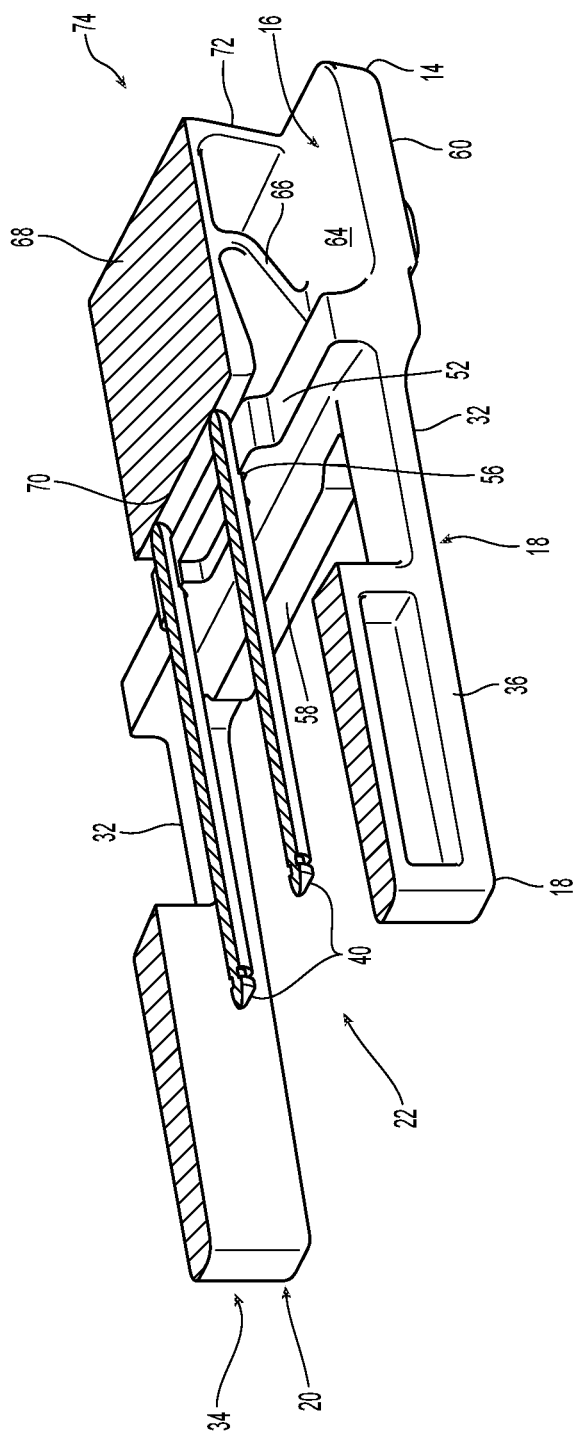
FIG. 3 is a left side perspective view of a horizontal cross section of the pin exchanger of FIG. 1.
Figure 4:
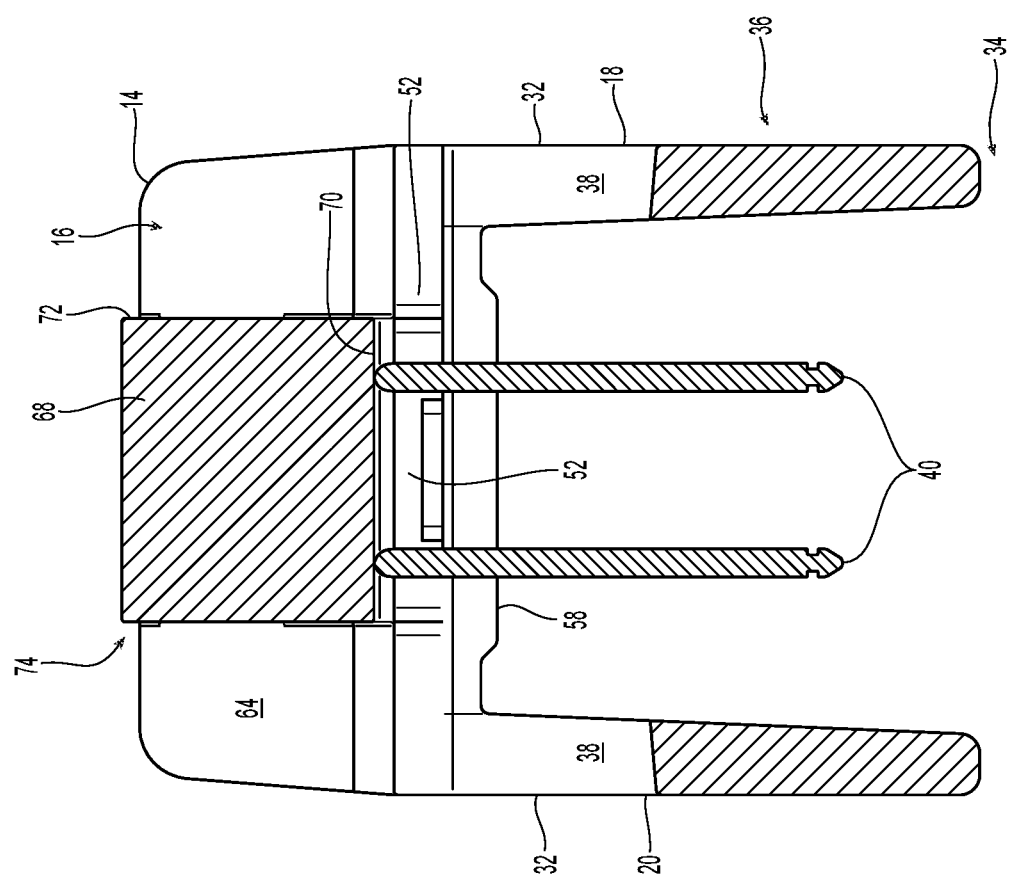
FIG. 4 is a top view of a horizontal cross section of the pin exchanger of FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector would meet with another fiber-optic connector or device, while the term "rear" or "rearward" is used to mean the direction from which the optical fibers enter into the fiber-optic ferrule or fiber optic connector. Thus, "front" with respect to the pin exchanger is illustrated in FIG. 1—as being where the guide beams terminate opposite the gripping elements—to the left in the figure. The rear or rearward direction would be the opposite direction. For a fiber optic connector, front is the end where the optical fibers are terminated at a front face and the rear is where the optical fibers enter the connector or fiber optic ferrule.

Further to the above discussion, illustrated in FIGS. 1-6 is one embodiment of a pin exchanger 10 according to the present invention. The pin exchanger 10 is to be used with MTP® brand fiber optic connectors, as well as other connectors that have fiber optic guide pins to align the fiber optic connectors. See, e.g, FIG. 6. As discussed below in more detail, the pin exchanger 10 is used with a field tool and adapter that assist in orienting a pin keeper to allow for the insertion and removal of guide pins. Returning to FIGS. 1-6, the pin exchanger 10 has a first gripping element 12 and a second gripping element 14 disposed substantially parallel to and spaced apart from the first gripping element 12. The two gripping elements 12,14 thus define a space 16 therebetween. The pin exchanger 10 has two guide beams 18,20, one guide beam attached to each side of the first and second gripping elements 12,14 and defining a guide pin area 22 therebetween. Each of the guide beams 18,20 have a first leg 30 extending from the first gripping element 12 and a second leg 32 extending from the second gripping element 14. The first leg 30 and second leg 32 are connected to one another at a distal end 34 (a front end) that is opposite from the gripping elements 12,14, at a connection area 36. The configuration of the legs 30,32 extending from the gripping elements 12,14 and terminating at the connection area 34 causes there to an opening 38 between the legs 30,32 on each side of the pin exchanger 10. The area and/or length of connection 36 at the end of the legs 30,32 may be larger or small than that illustrated in the figures as compared to the overall length L of the legs 30,32. The opening 38 between the legs 30,32 allows for there to be flexure of the pin exchanger 10 when an external force is applied, as discussed below.

The first gripping element 12 and the second gripping element 14 are used to grasp and hold fiber optic guide pins 40. The pin exchanger 10 has structures that assist in grasping and holding the fiber optic guide pins 40. Extending from the first gripping element 12 is a first protrusion 50 that extends toward the second gripping element 14 and into the space 16. Similarly, there is a second protrusion 52 that extends from the second gripping element 14 toward the first gripping element 12 and into the space 16. The two protrusions 50,52 are aligned with one another and form a junction 54 to engage a portion of at least one guide pin 40. The junction 54 may simply be a space to allow for the fiber optic guide pin to be retained between the first protrusion 50 and the second protrusion 52. Alternatively, if the material used to make the pin exchanger 10 is flexible, then there may not need to be space between the first protrusion 50 and the second protrusion 52 at all. As is illustrated, in FIG. 5 among others, there may be a portion of a v-groove 56 in each of the first protrusion 50 and the second protrusion 52 to assist with the holding and orientation of fiber optic guide pins 40 while being held. Additionally, there may only be a v-groove in one of the protrusions or other structure or groove therein and still fall within the scope of the invention. The area of the protrusions that include v-grooves 56 may also extend farther into the space 16 than the remainder of the protrusions. See, e.g., FIG. 3. Since there are typically two fiber optic guide pins 40 that are needed in a fiber optic connector, the pin exchanger 10 is preferably designed and manufactured to hold two fiber optic guide pins 40 using four v-grooves 56—two in each of the protrusions. Naturally, if there is a hermaphroditic connector, then only fiber optic guide pin 40 may be disposed within the pin exchanger 10. The protrusions 50,52 are illustrated as extending across the width of the gripping elements, but each of the protrusions may not extend as far or be divided into two separate parts on each of the gripping elements.

Figure 5:
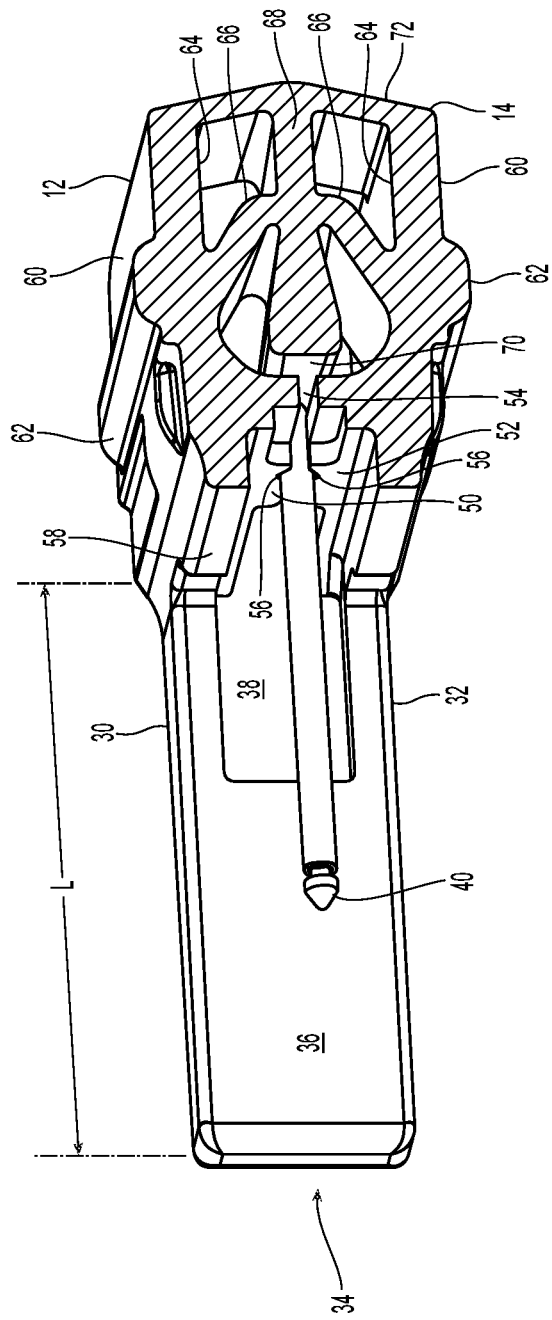
FIG. 5 a left side perspective view of a vertical cross section of the pin exchanger of FIG. 1.

On the outer surfaces 60 of the first gripping element 12 and the second gripping element 14 are structures 62 that may be used with a vice-like tool to apply additional pressure and force on the fiber optic guide pins 40 through the protrusions 50,52. These additional structures 62 may include indentations and extensions to receive and maintain the position of the vice-like tool. The first gripping element 12 and the second gripping element 14 have inside surfaces 64 from which flexure elements emanate and extend into the space 16. FIG. 5 illustrates that one forward flexure element 66 extends from first gripping element 12 and the second gripping element 14 to intersect at a middle flexure element 68. A forward portion of the middle flexure element 68 terminates behind protrusions 50,52 at a stop surface 70. The stop surface 70 prevents the fiber optic guide pins 40 from moving rearwardly in the pin exchanger during use or storage. It should be noted that front end of the fiber optic guide pins 40 (those that extend beyond the front face of the fiber optic ferrule) are secured within the pin exchanger 10. The pin exchanger 10 also includes a pin exchanger stop 58 that is positioned between the guide beams 18,20. The pin exchanger 10 is inserted into the adapter 100 and the fiber optic connector 90 until the pin exchanger 10 engages the inner housing of the fiber optic connector 90. The dimensions of the pin exchanger and the adapter are such that when the pin exchanger stop 58 engages the inner housing of the fiber optic connector 90, the guide pins 40 are disposed in the correct location relative to the fiber optic connector. When the guide pins are to be removed, the pin exchanger stop 58 locates the pin exchanger 10 so that the guide pins are in the correct location to be secured by the pin exchanger 10 for removal.

On the other side of the forward flexure element 66, the middle flexure element 68 extends rearwardly to intersect with rear flexure element 72 that extends from first gripping element 12 and the second gripping element 14 at a proximal or rear end 74. While the flexure elements 66,68,72 are disposed only within a portion of the space 16 (see FIG. 4), the flexure elements could extend to be disposed in more or less of the space 16 and still fall within the scope of the present invention.

The legs 30,32 must extend farther than the fiber optic guide pins 40 for at least two reasons. First, the legs 30,32 protect the fiber optic guide pins 40 from being dislodged or moved during insertion or removal of the guide pins. Additionally, the pin exchanger 10 can act as a storage tool for a technician in the field. The technician may have a number of loaded pin exchangers (as well as empty ones to be used to convert the connectors from male to female) on hand for occasional uses. When the technician goes to use one of the pin exchangers 10, the fiber optic guide pins should not be missing, loose, or out of orientation. Thus, the front end of the guide pins 40 are a distance L2 behind the distal end 34 of the guide beams 18,20. The distance L2 is preferably about 3.4 mm, but could be any positive distance that allows for the guide beams 18,20 to be used as guides for inserting/removing the guide pins.

Also as explained below, the guide beams 18,20 are used in conjunction with an adapter to align the pin exchanger 10 and fiber optic guide pins 40 with a fiber optic connector and, in particular, with the guide pin holes in the fiber optic ferrule of the fiber optic connector.

Figure 6:
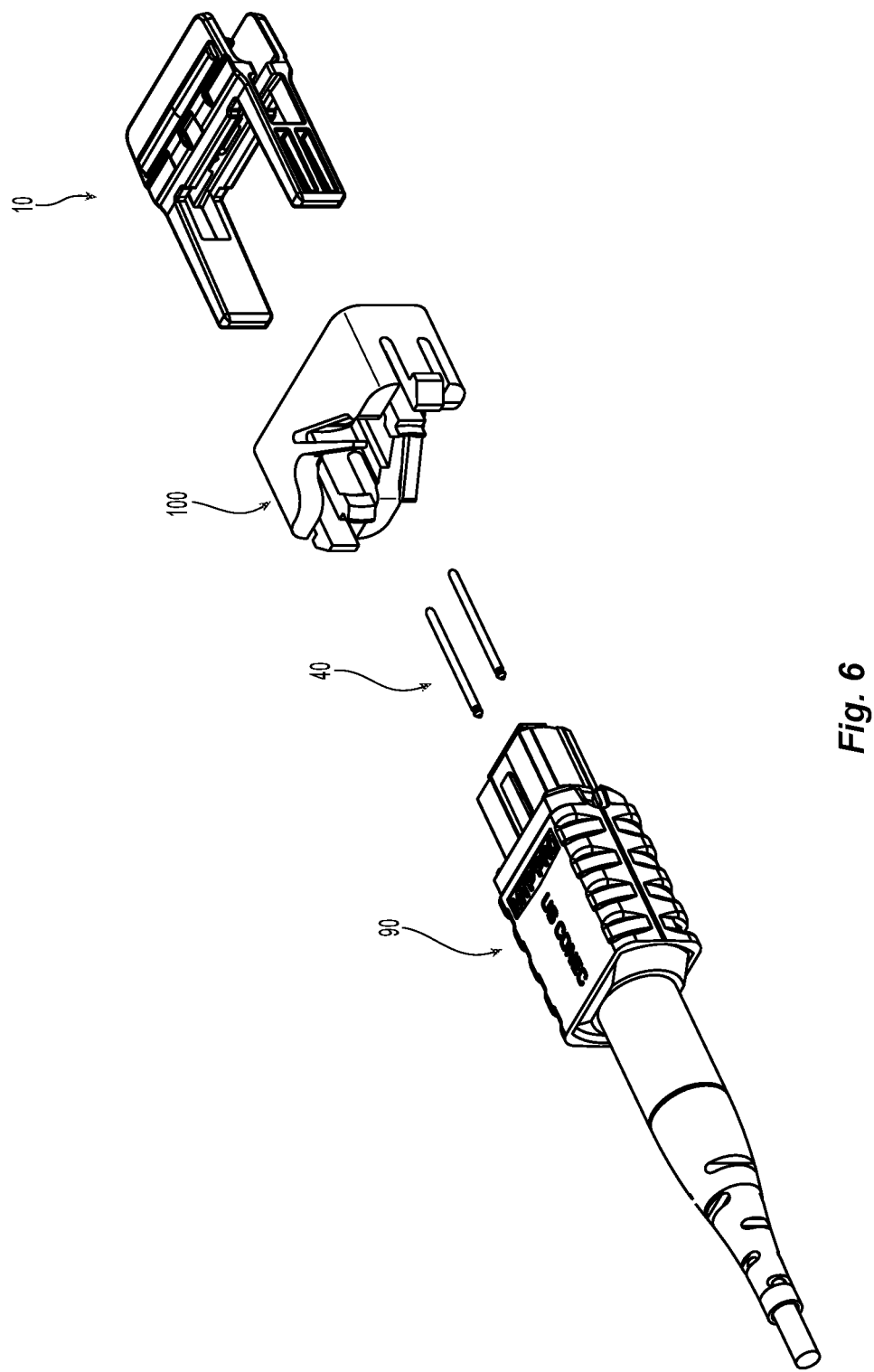
FIG. 6 is an exploded view of the pin exchanger of FIG. 1, one embodiment of an adapter according to the present invention, guide pins, and fiber optic connector.
Figure 7:
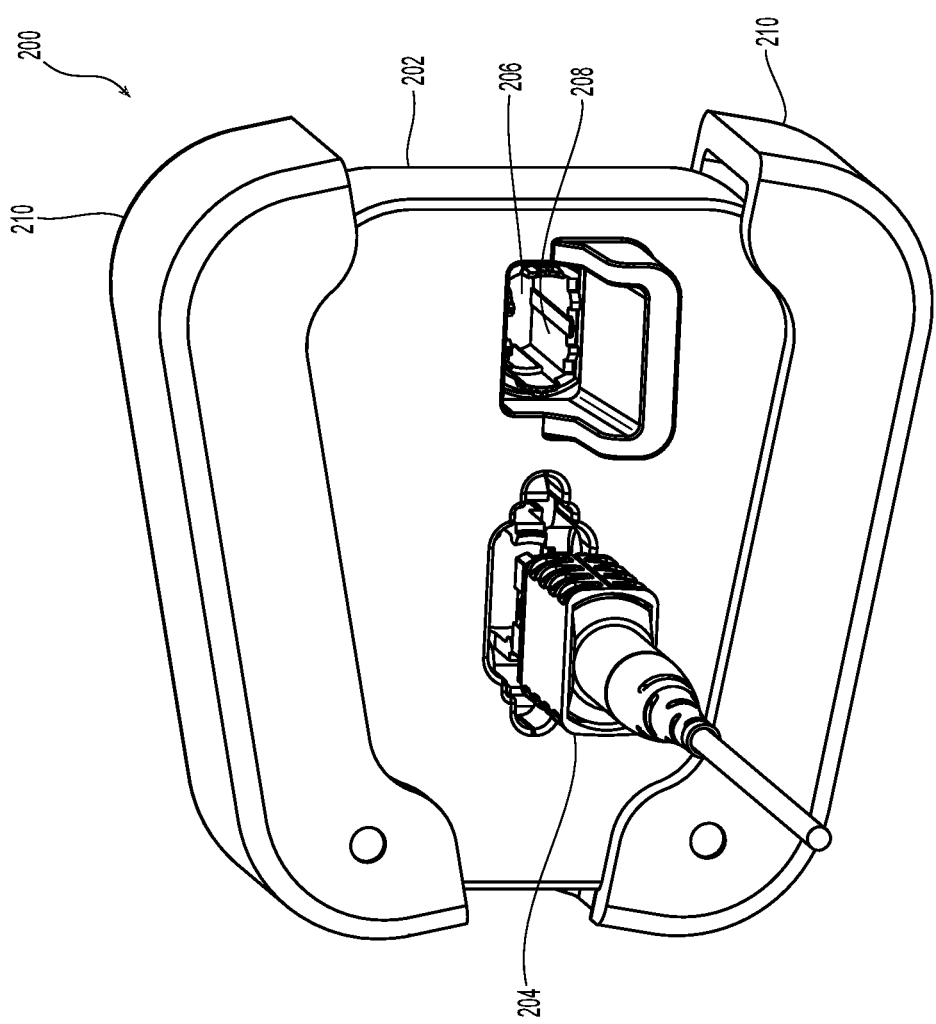
FIG. 7 is an elevational view of one embodiment of a field tool for use with the pin exchanger of FIG. 1 according to the present invention.
Figure 8:
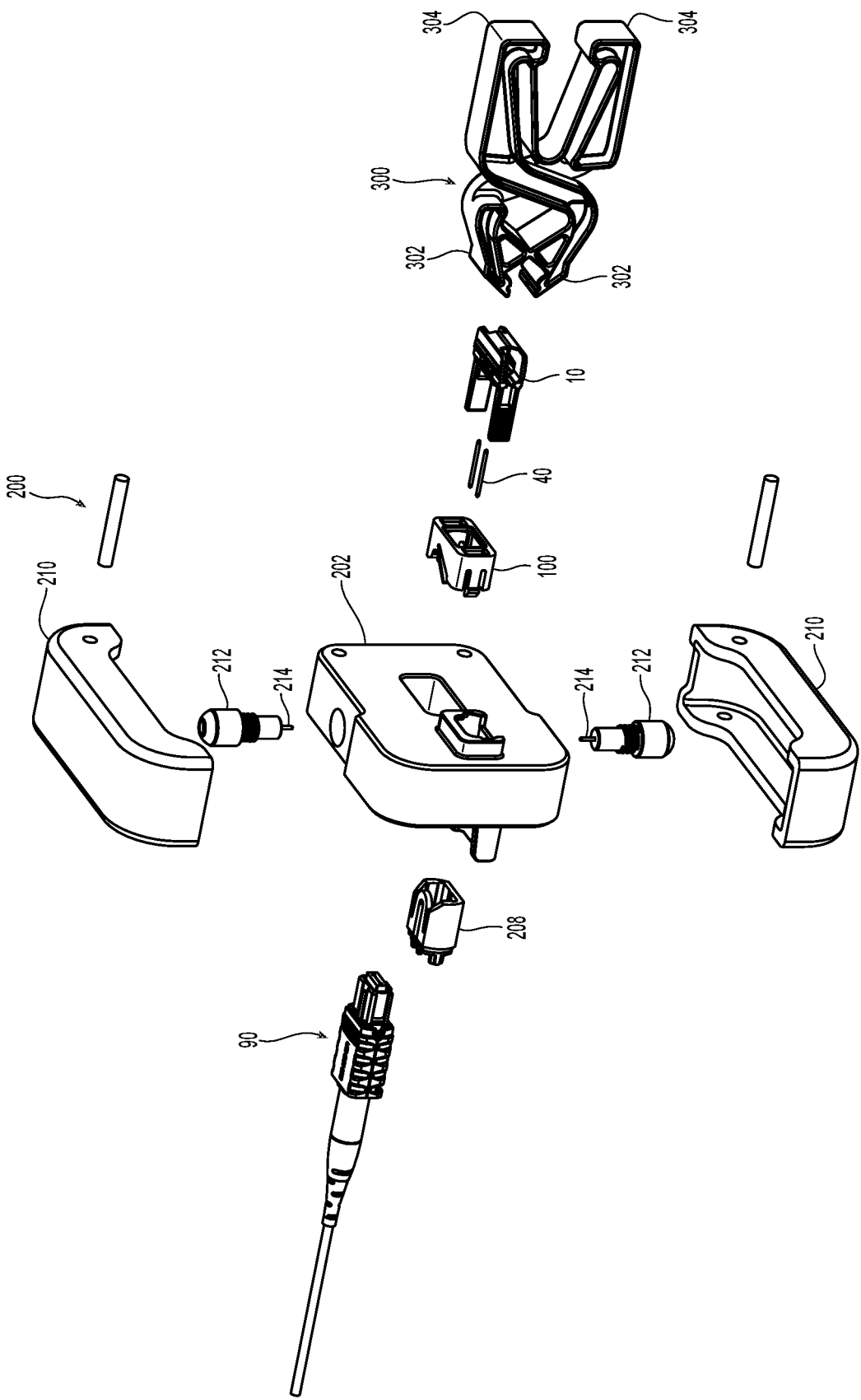
FIG. 8 is an exploded view of the field tool of FIG. 7, and the adapter, guide pins, and fiber optic connector of FIG. 6 and one embodiment of a gripper tool according to the present invention.

The pin exchanger 10 is used with a fiber optic connector 90 and an adapter 100 to insert or remove the guide pins 40. See FIG. 6. The adapter 100 holds the fiber optic connector 90 in a manner that typical adapters hold an MTP® brand connector—with two latch beams that engage the latch lock on the fiber optic connector 90 as discussed in more detail below. While FIG. 6 illustrates the pin exchanger 10, a fiber optic connector 90, adapter 100, and guide pins 40, there is also a field tool 200 in which the adapter 100 is inserted. See also FIGS. 7-9. The field tool 200 has a main body 202 with an opening 204 to hold the adapter 100. The field tool 200 also has a second opening 206 to hold a polarity changing insert 208. The polarity changing insert 208 and method of changing the polarity of an MTP® brand connector is disclosed and claimed in Applicant's copending application Ser. No. 15/383,881, the contents of which are incorporated herein in their entirety by reference. While the adapter 100 is on the left side of the field tool 200, the adapter 100 could also be on the right side (in FIG. 7) and the polarity changing insert 208 on the left side.

Figure 9:
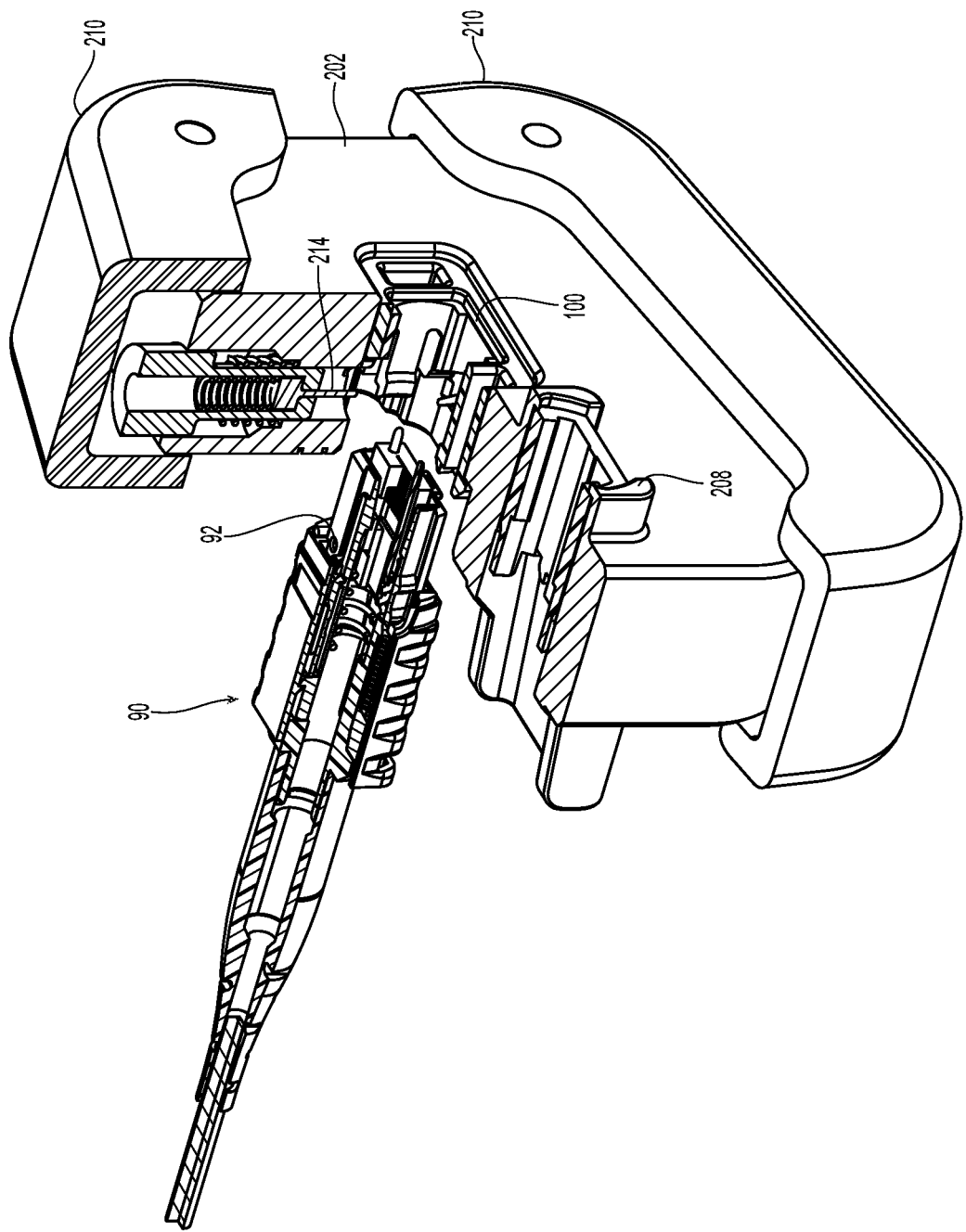
FIG. 9 is a front right perspective view of a cross section of the fiber optic connector and field tool of FIG. 7.
Figure 10:
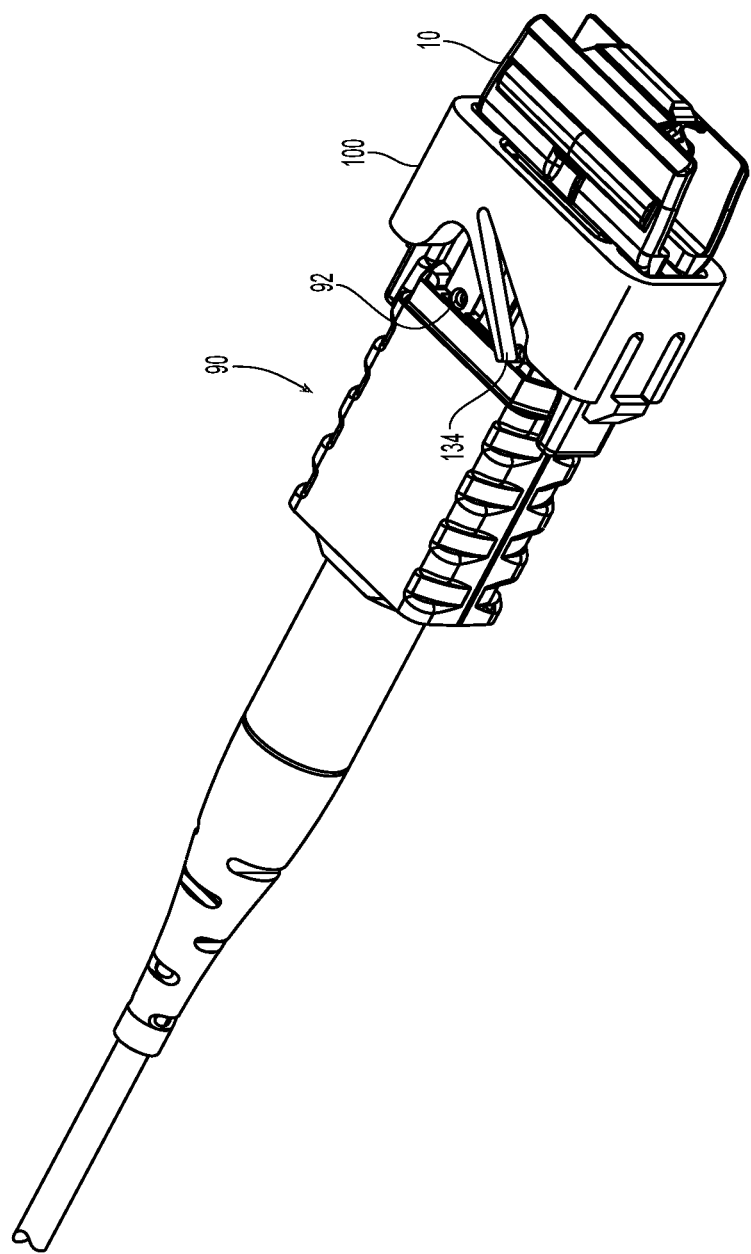
FIG. 10 is a top perspective view of the pin exchanger, the adapter, fiber optic connector with the field tool removed for clarity.
Figure 12:
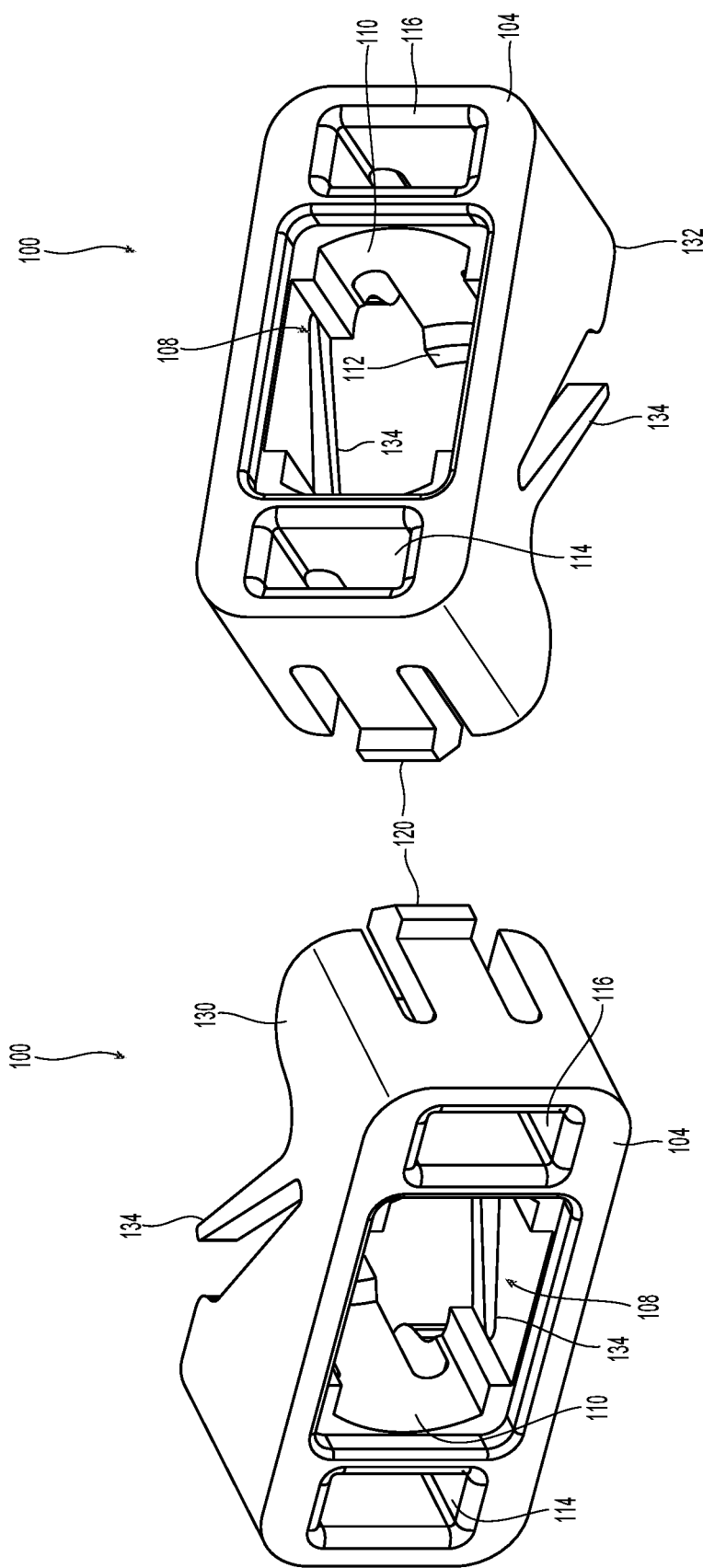
FIG. 12 is a top and bottom perspective view of the adapter of FIG. 6 from the front side.

The field tool 200 also has two handles 210 that engage plungers 212 when the handles 210 are squeezed together. The plungers 212 have pins 214 that are inserted into the opening 204 and the fiber optic connector 90 to engage a pin keeper that is inside the fiber optic connector 90. One such pin keeper and method of use is disclosed and claimed in Applicant's copending application Ser. No. 15/383,356, the contents of which are incorporated herein in their entirety by reference. When the pins 214 are inserted into the fiber optic connector 90 then the guide pins 40 can be inserted or removed. As illustrated in FIGS. 9 and 10, there is an opening 92 in the fiber optic connector 90 into which the pins 214 can be inserted to release the guide pins 40.

Also provided is a gripper 300. The gripper 300 is the means by which the external force is applied to the pin exchanger 10. The gripper's jaws 302 are disposed to engage the structures 62 on the pin exchanger 10. When the gripper's handles 304 are squeezed together, the jaws 302 are forced closer to one another, pushing the first gripping element 12 and the second gripping element 14 together, thereby exerting more force through the first protrusion 50 and the second protrusion 52 to the guide pins 40 in the pin exchanger 10. Thus, when inserting the guide pins 40 into the fiber optic connector 90, the technician can use the gripper 300 to insert the pin exchanger 10 into the adapter 100 and the fiber optic connector 90 so that the guide pins 40 are less likely to move relative to the adapter 100, the fiber optic connector 90, and pin exchanger 10. When removing the fiber optic guide pins 40, the pin exchanger 10 can be inserted into the adapter 100 and engage the guide pins 40 before the gripper 300 is applied to the pin exchanger 10 and an external force is applied through the first protrusion 50 and the second protrusion 52 to the guide pins 40 to ensure that the guide pins 40 are captured in the pin exchanger 10 before the pin exchanger 10 is removed from the adapter 100 and the fiber optic connector 90.

Turning now to the adapter 100 and FIGS. 11-14, the adapter 100 has a main body 102 with a front end 104 and a back end 106 opposite to the front end 104. The adapter 100 has a first opening 108 extending between the front end 104 and the back end 106 to receive the fiber optic connector 90 through the back end 106. See also FIG. 10 (the field tool 200 being removed to allow for a clearer view). Extending into the first opening 108 from the sides 110 that help define the opening 108 is a pair of projections or latches 112 to engage the fiber optic connector 90. As is known in the art, the latches 112 engage latch locks on the fiber optic connector 90 to hold the fiber optic connector 90 stationary relative to the adapter 100. On either side of the first opening 108 are two guide beam openings—a first guide beam opening 114 and a second first guide beam opening 116 to receive the guide beams 18,20 from the front end 104. The two guide beam openings 114 and 116 are positioned exactly relative to the fiber optic connector 90 fixed in the opening 108. The v-grooves 54 are positioned exactly relative to the guide beams 18,20. Thus, when the guide beams 18,20 are disposed within the guide beam openings 114,116, the guide pins 40 in the pin exchanger 10 will align with the guide pin openings in the fiber optic connector 90.

The adapter 100 may also have secondary latches 120 extending outwardly from a wall portion of each of the guide beam openings 114,116 to secure the adapter 100 within the field tool 200. Also extending from a top portion 130 and a bottom portion 132 of the main body 102 are connector springs 134. As the fiber optic connector 90 is inserted into the adapter 100, the connector springs 134 push the outer housing or the push-pull housing 94 of the fiber optic connector 90 rearwardly to expose the opening 92. See FIG. 10.

It will be apparent to those skilled in the art that various modifications and variations can be made to the present invention without departing from the spirit and variations of this invention provided they come within the scope of the appended claims and their equivalents.

We claim:

1. A combination of a field tool and a pin exchanger to change a gender of a fiber optic connector, comprising:
    a field tool further comprising:
        a main body with an opening to receive an adapter,
        two handles movable towards each other, and
        a pair of plungers in relatively offset positions within the main body and each having a pin configured to engage a pin keeper in the fiber optic connector when the two handles are moved towards each other via corresponding offset openings in the fiber optic connector; and
    a pin exchanger engageable with the field tool at the adapter, the pin exchanger further comprising:
        a pair of gripping elements having a space between each gripping element of the pair of gripping elements, a pair of guide pins being receivable in the space, and
        a guide beam attached to each gripping element of the pair of gripping elements,
        wherein the adapter of the field tool includes two guide beam openings to respectively receive the guide beam attached to the each gripping element during a gender change operation of the fiber optic connector.

2. The combination according to claim 1, wherein during the gender change operation, the pair of guide pins are partly positioned inside the opening.

3. The combination according to claim 1, wherein the two handles are joined to the main body but separated from each other.

4. The combination according to claim 1, wherein during the gender change, the guide beam engages a housing of the fiber optic connector.

5. The combination according to claim 1, wherein the guide beam is positioned between two latches of the adapter.

6. The combination according to claim 1, wherein each guide pin in the pair of guide pins has an end with a groove, the end with the groove positioned freely outside the pair of gripping elements.

7. The combination according to claim 1, wherein the guide beam protrudes beyond the two guide beam openings of the adapter when the pin exchanger is engaged with the adapter.

8. The combination according to claim 1, wherein the adapter comprises two secondary latches to engage with the field tool when the adapter is positioned inside the opening.

9. The combination according to claim 1, wherein the pin exchanger further comprises a pair of protrusions extending towards each other into the space respectively from the pair of gripping elements, wherein the pair of guide pins are engaged to the pair of protrusions.

10. A combination of a field tool, a pin exchanger and an adapter to change a gender of a fiber optic connector comprising:
    a field tool having a main body with two handles positioned on opposite sides of the main body, the two handles angularly movable towards each other about respective pivot points on the main body;
    an adapter positioned inside an opening of the main body; and
    a pin exchanger engageable with the field tool at the adapter and having a pair of gripping elements with a space therebetween to receive a pair of guide pins for insertion into or for removal from the fiber optic connector, the pin exchanger also having a first guide beam and a second guide beam on opposite sides thereof,
    wherein the adapter is configured to engage both the pair of guide beams and the fiber optic connector during a gender change operation when at least a portion of the fiber optic connector is received inside the adapter, and
    wherein the field tool further comprises a pair of plungers with pins in relatively offset positions within the main body to engage a pin keeper of the fiber optic connector received at least partially inside the adapter.

11. The combination according to claim 10, wherein the pins of the pair of plungers are positioned partially inside the fiber optic connector via fiber optic connector openings when the pair of plungers are angularly rotated towards each other to engage the pin keeper.

12. The combination according to claim 11, wherein the adapter includes a pair of connector springs to engage an outer housing of the fiber optic connector thereby exposing the fiber optic connector openings on an inner housing of the fiber optic connector.

13. The combination according to claim 10, wherein the adapter includes a central opening to receive the fiber optic connector and two side openings to respectively receive the first guide beam and the second guide beam of the pin exchanger.

14. The combination according to claim 10, wherein when the pin exchanger and the fiber optic connector are positioned inside the adapter, the pair of guide pins are aligned with a pair of guide pin openings in the fiber optic connector.

15. The combination according to claim 10, further comprising a gripper engageable with the pin exchanger, the gripper having handles to apply a force to the pin exchanger.

16. The combination according to claim 10, wherein the pin exchanger further comprises a pair of protrusions extending towards each other into the space respectively from the pair of gripping elements, wherein the pair of guide pins are engaged to the pair of protrusions during both an insertion and a removal of the pair of guide pins for the gender change operation.

17. The combination according to claim 10, wherein the pin exchanger engages the fiber optic connector.

18. The combination according to claim 17, wherein the pin exchanger engages an inner housing of the fiber optic connector.

19. The combination according to claim 10, wherein the fiber optic connector is an MPO-type connector.

20. The combination according to claim 10, wherein the pair of guide pins are positioned between the first guide beam and the second guide beam.

* * * * *